United States Patent
Sonoda et al.

(10) Patent No.: US 9,290,099 B2
(45) Date of Patent: Mar. 22, 2016

(54) BATTERY CHARGING APPARATUS FOR VEHICLE

(71) Applicant: HONDA MOTOR CO., LTD., Tokyo (JP)

(72) Inventors: Yutaka Sonoda, Wako (JP); Katsuhiro Ouchi, Wako (JP); Kazuhiko Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 14/228,505

(22) Filed: Mar. 28, 2014

(65) Prior Publication Data

US 2014/0300318 A1    Oct. 9, 2014

(30) Foreign Application Priority Data

Apr. 8, 2013    (JP) .................................. 2013-080813

(51) Int. Cl.
*H02J 7/00* (2006.01)
*B60L 11/18* (2006.01)
*B60L 3/00* (2006.01)

(52) U.S. Cl.
CPC ........... *B60L 11/1803* (2013.01); *B60L 3/0038* (2013.01); *B60L 2240/421* (2013.01); *B60L 2260/44* (2013.01); *Y02T 10/642* (2013.01); *Y02T 10/7005* (2013.01)

(58) Field of Classification Search
CPC .................................................... Y02T 90/14
USPC ........................................................ 320/109
See application file for complete search history.

(56) References Cited

U.S. PATENT DOCUMENTS

| 2007/0267997 | A1* | 11/2007 | Kanazawa | H02J 7/16 320/108 |
| 2008/0191664 | A1* | 8/2008 | Abe | H02J 7/1461 320/137 |
| 2012/0112693 | A1* | 5/2012 | Kusch | B60L 11/005 320/109 |
| 2013/0009595 | A1* | 1/2013 | Brown | F28D 15/0266 320/108 |

FOREIGN PATENT DOCUMENTS

JP    2012-60705 A    3/2012

OTHER PUBLICATIONS

Morcos; Battery Chargers for Electric Vehicles; Nov. 2000; IEEE Power Engineering Review; pp. 8-11.*

* cited by examiner

*Primary Examiner* — Suresh Memula
(74) *Attorney, Agent, or Firm* — Birch, Stewart, Kolasch & Birch, LLP (57) ABSTRACT

A battery charging apparatus includes a position sensor for outputting a position detection signal, a sensor for detecting an output current or voltage of a predetermined phase, a regulator for supplying DC power obtained by rectifying three-phase AC from the generator to a battery, and an inverter control section for executing energization control of the respective switching elements of the regulator based on a phase of an induced voltage of the generator calculated on the basis of the position detection signal. The inverter control section inputs a revolution speed signal Ne of the generator, the position detection signal Tp, and either output signal out of a current signal or a voltage signal detected by the sensor, and estimates an error of an attaching position of the position sensor with respect to the induced voltage of the predetermined phase based on the position detection signal and the output signal.

20 Claims, 6 Drawing Sheets

BATTERY CHARGING APPARATUS FOR VEHICLE

CROSS-REFERENCE TO RELATED APPLICATIONS

The present application claims priority under 35 USC 119 to Japanese Patent Application No. 2013-080813 filed Apr. 8, 2013 the entire contents of which are hereby incorporated by reference.

BACKGROUND OF THE INVENTION

1. Field of the Invention

The present invention relates to a charging apparatus for charging a battery for a vehicle.

2. Description of Background Art

In a three-phase brushless motor, energization control of a stator coil is executed based on an output signal of a rotor sensor arranged corresponding to each phase. However, when output timing of a sensor signal shifts due to an error of an attaching position of the rotor sensor, appropriate energization timing of the stator coil is not secured. Thus, an accurate motor output control cannot be executed.

In JP-A No. 2012-060705, a phase shift between the zero-cross point of an induced voltage of each phase and the rising of a sensor signal is detected as an error of an attaching position of a rotor sensor in a regenerative power generation state of a motor. Also, JP-A No. 2012-060705 discloses a technology for highly precisely controlling energization timing of each stator coil based on the detected phase shift.

Also, in a battery charging apparatus that uses a three-phase AC generator, energization control of each phase is executed based on the sensor signal that detects rotation of a rotor of a generator. Therefore, similarly to the case of the three-phase brushless motor, it is desirable to detect the error of the attaching position of the sensor.

However, in the battery charging apparatus, an output terminal of the generator is connected to a battery and a load through a regulator. Therefore, the method disclosed in JP-A No. 2012-060705 can be applied only in a region of an ultra-low revolution speed (<idling revolution speed) at the time of an engine start when a regulator output current does not flow. Also, there is a problem wherein in a region of less than the idling revolution speed, fluctuation of rotation of an engine is large and an accurate measurement cannot be executed. Thus, measurement can be executed only at a limited timing of immediately after the engine start.

SUMMARY AND OBJECTS OF THE INVENTION

An object of an embodiment of the present invention is to detect an error in an attaching position of a sensor that detects rotation of a rotor of a generator.

According to an embodiment of the present invention, as a means for achieving the above-mentioned object, following configurations are provided.

According to an embodiment of the present invention, a position sensor outputs a position detection signal that expresses a rotation position of a rotor of a three-phase AC generator with a sensor that detects an output current or an output voltage of a predetermined phase of the three-phase AC generator. A regulator includes a plurality of rectifying elements and a plurality of switching elements and supplies DC power obtained by rectifying three-phase AC outputted from the three-phase AC generator to a battery. A control circuit executes energization control of the respective switching elements of the regulator based on a phase of an induced voltage of the three-phase AC generator calculated on the basis of the position detection signal, in which the control circuit includes input means that inputs a revolution speed signal showing the revolution speed of the three-phase AC generator, the position detection signal, and either output signal out of a current signal or a voltage signal detected by the sensor. Estimate means are provided for estimating an error of an attaching position of the position sensor with respect to the induced voltage of the predetermined phase based on the position detection signal and the output signal.

According to an embodiment of the present invention, a position sensor outputs a position detection signal for expressing a rotation position of a rotor of a three-phase AC generator, a sensor) for detecting an output current or an output voltage of a predetermined phase of the three-phase AC generator. A regulator includes a plurality of rectifying elements and a plurality of switching elements and supplies DC power obtained by rectifying three-phase AC outputted from the three-phase AC generator to a battery. A control circuit executes energization control of the respective switching elements of the regulator based on a phase of an induced voltage of the three-phase AC generator calculated on the basis of the position detection signal. The control circuit includes input means for inputting a revolution speed signal showing a revolution speed of the three-phase AC generator, the position detection signal, and either output signal out of a current signal or a voltage signal detected by the sensor. A measurement means measures a first phase difference between the position detection signal and the output signal based on the position detection signal and the output signal with calculation means for calculating a second phase difference between the induced voltage of the predetermined phase and the output signal based on the revolution speed signal. Estimate means estimates a third phase difference between the position detection signal and the induced voltage of the predetermined phase from the first and second phase differences.

According to an embodiment of the present invention, the control circuit executes the energization control using the third phase difference.

According to an embodiment of the present invention, the control circuit suspends the energization control, estimates the third phase difference, and thereafter restarts the energization control using the estimated third phase difference.

According to an embodiment of the present invention, the control circuit executes all phase short circuit in the energization control, estimates the third phase difference, and thereafter restarts the energization control using the estimated third phase difference.

According to an embodiment of the present invention, the input means further inputs a terminal voltage signal that shows a terminal voltage of the battery, and the calculation means corrects the second phase difference based on the terminal voltage signal.

According to an embodiment of the present invention, the calculation means calculates the second phase difference referring to a map that expresses a relation among the revolution speed signal, the terminal voltage signal, and the second phase difference.

According to an embodiment of the present invention, the control circuit estimates the third phase difference in a plurality of revolution speed ranges of the three-phase AC generator.

According to an embodiment of the present invention, the control circuit uses the third phase difference estimated in the revolution speed range of a higher revolution speed for the energization control.

According to an embodiment of the present invention, an error of the attaching position of the position sensor can be estimated based on the position detection signal, the output signal, and the revolution speed signal.

According to an embodiment of the present invention, as the reference timing of the energization control, not the output timing of the position detection signal but the phase of the induced voltage of a predetermined phase can be used.

According to an embodiment of the present invention, by detecting the output signal of a predetermined phase in a state the energization control is temporarily suspended, the attaching error of the position sensor with respect to the induced voltage of a predetermined phase can be estimated. Thus, the energization control can be precisely executed on the basis of the phase of the induced voltage estimated.

According to an embodiment of the present invention, by detecting the output signal of a predetermined phase in a state of all phase short circuits temporarily in the energization control, the attaching error of the position sensor with respect to the induced voltage of a predetermined phase can be estimated. Thus, the energization control can be precisely executed on the basis of the phase of the induced voltage estimated.

According to an embodiment of the present invention, the third phase difference can be estimated more highly precisely considering the fluctuation of the second phase difference according to the terminal voltage of the battery.

According to an embodiment of the present invention, it is possible to obtain and correct the second phase difference using the map.

According to an embodiment of the present invention, the third phase difference can be estimated in a plurality of the revolution speed ranges of the three-phase AC generator.

According to an embodiment of the present invention, the third phase difference estimated in a high revolution speed range where rotation of the three-phase AC generator is stabilized more can be used for the energization control.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Below, a battery charging apparatus of an embodiment in relation with an embodiment of the present invention will be described in detail referring to the drawings. Note that the battery charging apparatus of the embodiment is one that is used for a vehicle such as a motorcycle.

Figure 1:
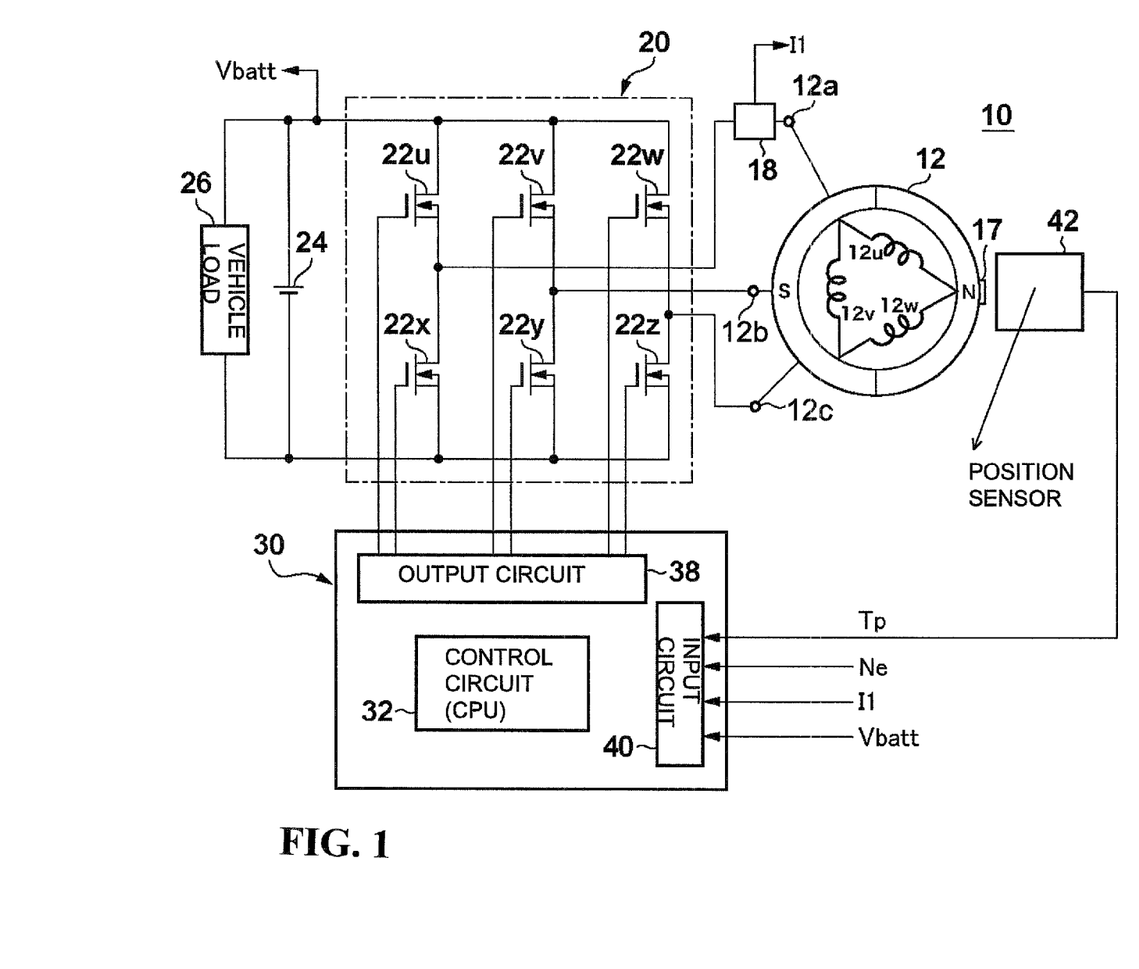
FIG. 1 is a drawing explaining the electrical connection of a three-phase AC generator and a battery charging apparatus

FIG. 1 is a drawing explaining the electrical connection of the three-phase AC generator and the battery charging apparatus.

A three-phase AC generator (hereinafter referred to as a generator) 10 shown in FIG. 1 is a magnet generator driven by a prime mover such as an internal combustion engine. The magnet generator includes a rotator (rotor) 12 in which a magnetic field is formed by attaching permanent magnets to a yoke with a stationary part (stator) being formed of an armature core and armature windings $12u$, $12v$, $12w$ wound around the core. The rotor is attached to a rotary shaft of the prime mover, and the stator is fixed to an attaching part that is attached to a case, a cover and the like of the prime mover.

The three-phase power outputted by the armature windings $12u$, $12v$, $12w$ of the generator 10 is charged to a battery 24 that is a secondary battery through a regulator 20, and is supplied to a load 26 that is an electrical component in a vehicle. Note that although an example of delta connection of the armature windings is shown in FIG. 1, a star connection is also possible.

The regulator 20 formed of a MOS type FET functions as a rectifying/switching circuit that combines a full-wave rectifier and a switching element by a parasitic diode present between the drain and the source of the MOS type FET. The regulator 20 applies a control voltage to the armature windings $12u$, $12v$, $12w$ through the switching circuit, and controls the output voltage of the generator 10 so as to obtain a voltage appropriate as a charging voltage of the battery 24. Then, the DC voltage obtained by rectifying the three-phase voltage by the full-wave rectifier is supplied to the battery 24 and the load 26.

Drain terminals of switching elements $22u$, $22v$, $22w$ are connected to the positive electrode of the battery 24 with source terminals of these switching elements being connected to output terminals $12a$, $12b$, $12c$ of the generator 10, respectively. Also, source terminals of switching elements $22x$, $22y$, $22z$ are connected to a negative electrode of the battery 24, and drain terminals of these switching elements are connected to the output terminals $12a$, $12b$, $12c$ of the generator 10 respectively.

Further, in a line for connecting an output terminal of a predetermined phase (the U-phase output terminal $12a$ in this example) and the regulator 20 to each other, a current sensor 18 for detecting the current and a voltage sensor for detecting the voltage of the phase (the U-phase in this example) are disposed. Note that the current sensor and the voltage sensor are provided in the embodiment, however either one of them only has to be provided in implementing the invention.

An inverter control section 30 includes an input circuit 40 that inputs various signals, a control circuit 32 formed of one-chip microcomputers and the like, and an output circuit 38 that outputs a drive signal driving the switching elements of the regulator 20 to gates of the respective switching elements. The input circuit 40 inputs a position detection signal Tp outputted by a position sensor 42, a revolution speed signal Ne of the prime mover, a current signal I1 outputted by the current sensor 18, and a battery voltage signal Vbatt.

A CPU of the control circuit 32 (hereinafter referred to as a CPU 32) achieves various controls by executing programs stored in a ROM with a RAM being a work memory. The CPU 32 supplies an open/close signal of each switching element of the regulator 20 to the output circuit 38 based on a signal inputted to the input circuit 40. The output circuit 38 outputs a drive signal that opens/closes (on/off) each switching element of the regulator 20 according to the open/close signal, and the energization control of each switching element of the regulator 20 is achieved.

The drive signal, that is, the timing of energization for each switching element is controlled for example by a microcomputer using an energization control map prepared beforehand. Also, in the energization control, the phase control is executed in which, when the required current fluctuates due to fluctuation of the charging state of the battery and the load, the timing of energization with respect to each switching element is changed (advancing and retarding the angle). The phase control is a control method in which the energization timing of the switching element corresponding to each phase is advanced or retarded with respect to the position detection signal of each phase.

When a control voltage is applied to the armature winding 12u, the CPU 32 turns the switching element 22u on, and turns either one or both of the switching elements 22y and 22z on. Also, when a control voltage is applied to the armature winding 12v, the switching element 22v is turned on and either one or both of the switching elements 22x and 22z are turned on. Further, when a control voltage is applied to the armature winding 12w, the switching element 22w is turned on and either one or both of the switching elements 22x and 22y are turned on.

To the rotator (rotor) 12 of the generator 10, a reluctor 17 is fixed. The position sensor 42 is fixed to the attaching part of the generator 10 for example so as to oppose the reluctor 17, and generates the position detection signal Tp every time the reluctor 17 that rotates along with the rotor 12 passes nearby.

The reluctor 17 and the position sensor 42 are disposed so that the position detection signal Tp is outputted at the timing the induced voltage of a predetermined phase (the U-phase of the armature winding 12u for example) shifts from a negative voltage to a positive voltage (zero-cross point). Therefore, usually, the output timing of the position detection signal Tp is deemed to agree to the phase of the induced voltage, and the output timing of the switching element is determined based on the phase of the position detection signal Tp as a reference.

However, as described above, because there exists an error of the part dimension and the attaching position in the reluctor 17 and the position sensor 42, when the degree of shifting of the phase of the position detection signal Tp with respect to the phase of the induced voltage is measured and the output timing of the switching element is controlled based on the phase of the actual induced voltage, the energization control can be executed more highly precisely.

Note that the battery charging apparatus is formed of the position sensor 42, the current sensor 18 (or the voltage sensor), the regulator 20, the inverter control section 30 and the like.

Figure 3:
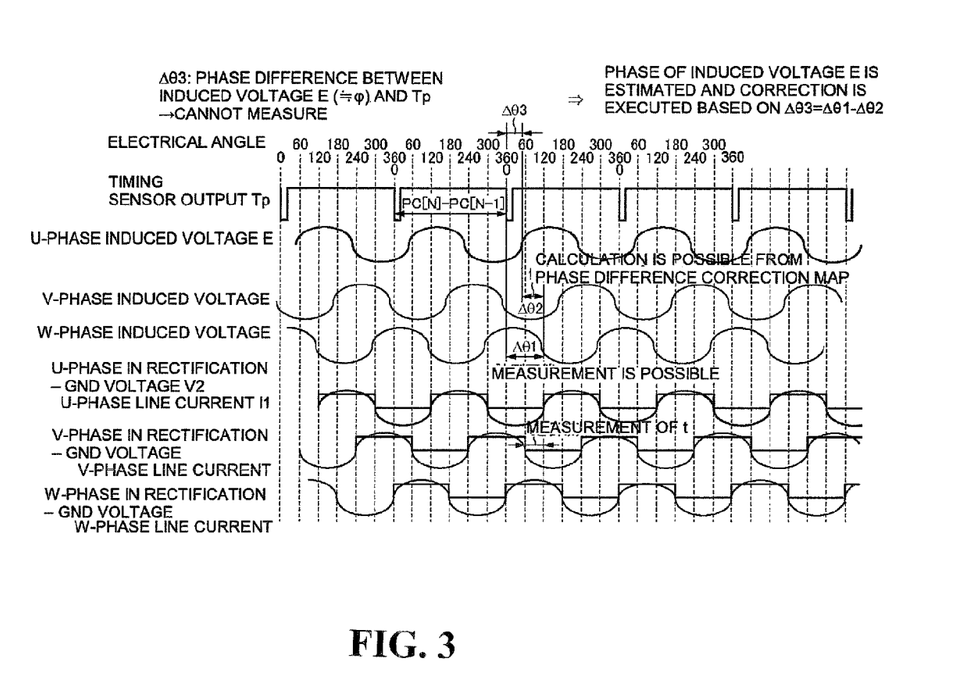
FIG. 3 is a drawing showing a relation among a position detection signal, an induced voltage, and a phase of a voltage and a current of an output terminal of the generator.

FIG. 3 is a drawing showing a relation among the position detection signal Tp, the induced voltage E, and the phase of the voltage V2 and the current I1 of the output terminal 12a of the generator 10. In FIG. 3, the phase difference intended to measure is the phase difference $\Delta\theta 3$ (the third phase difference) between the dropping of the position detection signal Tp and the zero-cross point of the induced voltage E which is equivalent to the error of the part dimension and the attaching position of the reluctor 17 and the position sensor 42. However, as described above, it is difficult to directly measure $\Delta\theta 3$.

On the other hand, it is possible to measure the phase difference $\Delta\theta 1$ (the first phase difference) between the dropping of the position detection signal Tp and the rising of the voltage V2 (the current I1). Therefore, when the phase difference $\Delta\theta 2$ (the second phase difference) between the rising of the voltage V2 (the current I1) and the zero-cross point of the induced voltage E is obtained, the phase difference $\Delta\theta 3$ can be estimated.

A measuring method for the output signal of the voltage V2 (the current I1) is hereinafter described. The voltage V2 (the current I1) is obtained by measuring a waveform outputted from the output terminal of the generator as it is. With this regard, three detection methods are possible.

Figure 6:
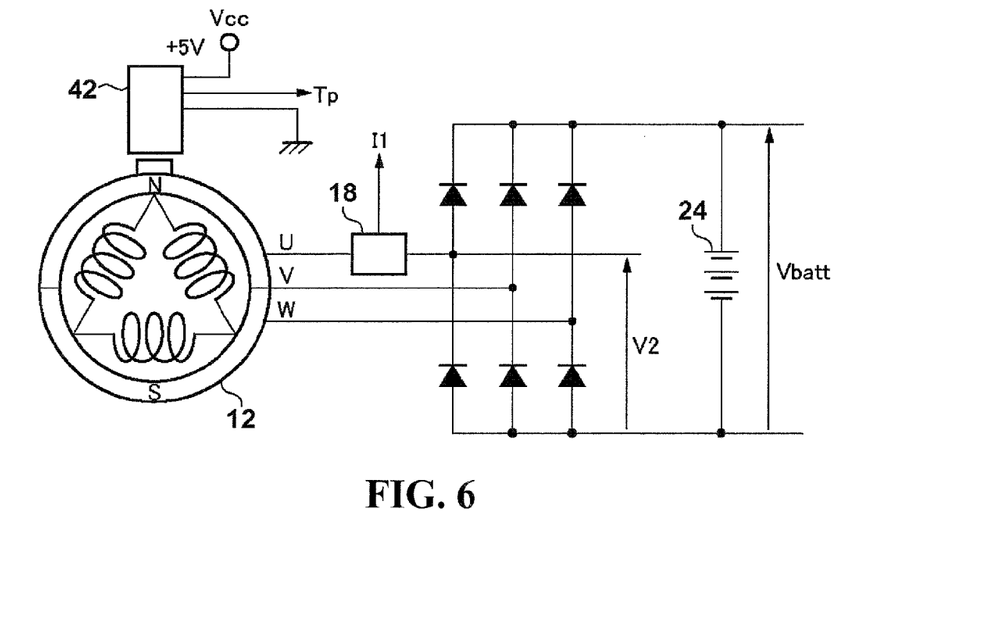
FIG. 6 is a drawing explaining a measuring method of an output signal of a voltage V2 (current I1)

For example, as shown in FIG. 6, by effecting a state wherein the energizing control is temporarily suspended (the full-wave rectification state), the voltage V2 and the current I1 of FIG. 3 which are the output signals of the predetermined phase can be detected from the voltage sensor or the current sensor.

Figure 7:
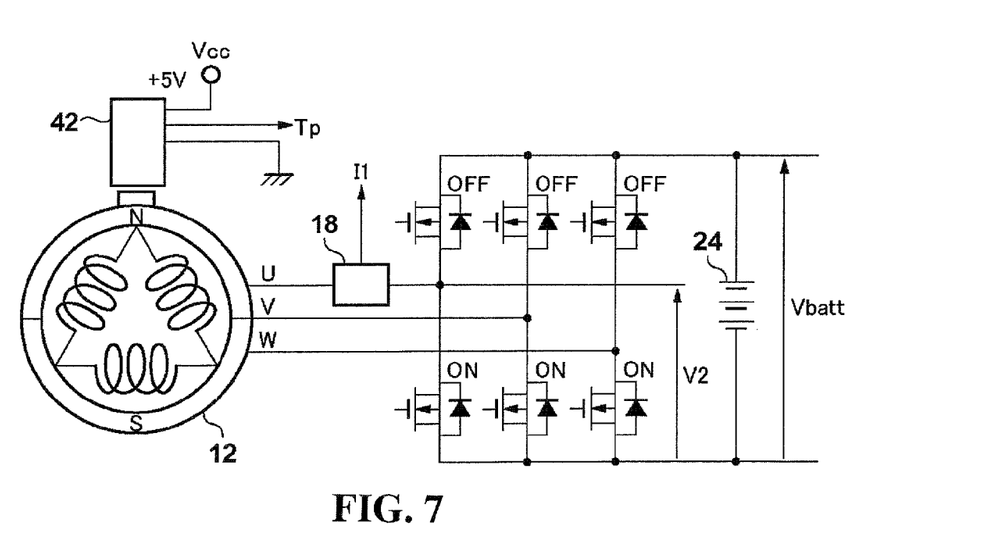
FIG. 7 is a drawing explaining another measuring method of the output signal of the voltage V2 (current I1).

As shown in FIG. 7, by effecting the all phase short circuit state in which all of the switching elements shown on the upper side of FIG. 7 are turned off and all of the switching elements shown on the lower side of FIG. 7 are turned on temporarily in the energization control, the voltage V2 and the current I1 of FIG. 3 which are the output signals of the predetermined phase can be detected from the voltage sensor or the current sensor similarly to the above although height of the waveform becomes shorter compared to those of the time of full-wave rectification.

Next, a calculating method for the phase difference $\Delta\theta 2$ (the second phase difference) between the rising of the voltage V2 (the current I1) and the zero-cross point of the induced voltage E is hereinafter described.

Figure 2A:
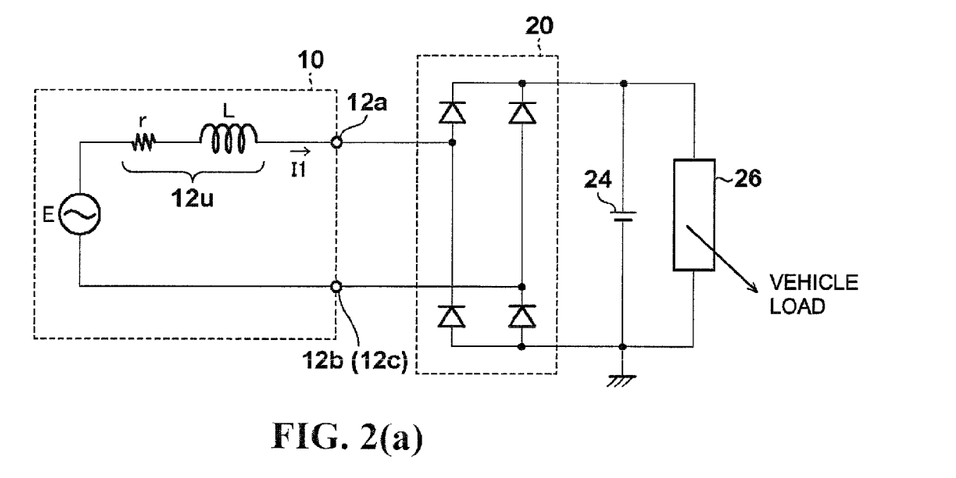
FIGS. 2(a) to 2(c) are drawings explaining action of a generator and the battery charging apparatus.
Figure 2B:
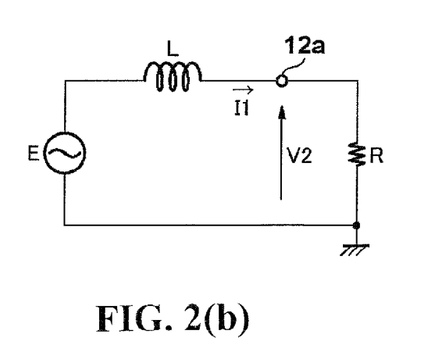
Figure 2C:
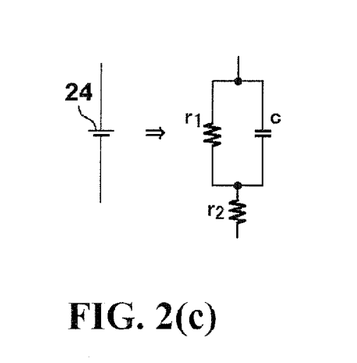

FIGS. 2(*a*) to 2(*c*) are drawings explaining the action of the generator 10 and the battery charging apparatus. FIG. 2(*a*) shows only the relation between the U-phase and the battery charging apparatus. As known, in the armature winding 12u of the generator 10, the voltage E is induced by the change of the magnetic field $\phi$. The armature winding 12u is equivalent to the inductance L connected in series to the voltage source (the induced voltage E), and the phase of the current I outputted from the output terminal 12a shows retarding with respect to the phase of the induced voltage E.

FIG. 2(*b*) is an equivalent circuit of a configuration shown in FIG. 2(*a*), and the resistance value r of the armature winding 12u is ignored because it is sufficiently small (r<<R). Also, because the load side from the regulator 20 is a DC circuit, a reactance component is ignored, and the load side from the regulator 20 is represented by the load resistance value R. More specifically, the generator 10 and the battery charging apparatus can be deemed as a circuit in which the voltage source E, the inductance L, and the load resistance value R are connected to each other in series. In FIG. 2(*b*), the induced voltage E, the current I, and the angle $\theta$ formed by the induced voltage E and the current I (that is, the phase difference $\Delta\theta 2$) are expressed by the expressions below.

$$E = -N \times d\phi/dt \tag{1}$$

$$I1 = E/(j\omega L + R) \tag{2}$$

$$\theta = \tan^{-1}(\omega L/R) \tag{3}$$

where N is the number of turn of the armature windings,
$\omega$ is the angular frequency (rad/s), and
R is the load resistance value ($\Omega$).

As described above, the phase difference Δθ3 (the third phase difference) between the dropping of the position detection signal Tp and the zero-cross point of the induced voltage E can be obtained from the phase difference Δθ1 (the first phase difference) between the dropping of the position detection signal Tp and the rising of the voltage V2 (the current I1) and the phase difference Δθ2 (the second phase difference) between the rising of the voltage V2 (the current I1) and the zero-cross point of the induced voltage E, and the relation therebetween is expressed by the expression below.

$$\Delta\theta 3 = \Delta\theta 1 - \Delta\theta 2 \tag{4}$$

Thus, the phase of the induced voltage E can be detected in a state the output terminal 12a is connected to the regulator 20. Thus, for the energizing control of each switching element of the regulator 20, precise energizing control based on the position detection signal Tp can be executed.

As the expression (3) shows, when the load resistance value R is sufficiently large (no load for example), the phase difference θ becomes zero degree, and the phase of the induced voltage E and the phase of the voltage of the output terminal 12a of the generator 10 agrees to each other. However, because the output terminal 12a is connected to the regulator 20, a state that the load resistance value R is sufficiently large such as no load cannot be expected, and the phase of the voltage V2 (=I1×R) of the output terminal 12a follows the phase of the current I1 and shows retarding with respect to the phase of the induced voltage E.

For charging the battery, it is desirable to utilize a range where the output current of the armature winding shows the maximum. For example, it is desirable to utilize a range of approximately ±10 degrees with respect to a phase where the current value shows a peak for charging. However, it is hard to detect the phase of the induced voltage E in a state wherein the output terminal 12a is connected to the regulator 20, and the energization control of each switching element of the regulator 20 comes to rely on the position detection signal Tp. However, the error of the part dimension and the attaching position of the reluctor 17 and the position sensor 42 is included in the position detection signal Tp, and detection of the error is indispensable for execution of precise energization control.

In charging the battery, the voltage V2 between the output terminal 12a of the generator 10 and grounding potential GND generally repeats between the battery voltage and the GND, and it is possible to detect the rising of (or the dropping) of the voltage V2 or the current I1.

When the revolution speed of the generator 10 is made Ne[rpm], ω=2πNe/60 [rad/s], and ωL/R naturally changes according to the revolution speed Ne. The revolution speed Ne is calculated from the position detection signal Tp.

Also, as shown in FIG. 2(c), the battery 24 can be deemed to be equivalent to a circuit in which a resistance and a capacitor are combined, and internal impedance of the battery 24 changes according to the charging state, that is, the terminal voltage Vbatt of the battery 24. Therefore, in estimation of the phase difference Δθ2, it is desirable to execute correction of the phase difference (hereinafter referred to as the phase difference correction) considering the revolution speed of the generator 10 (the revolution speed signal Ne of the prime mover) and the terminal voltage of the battery 24 (the battery voltage signal Vbatt).

Figure 4:
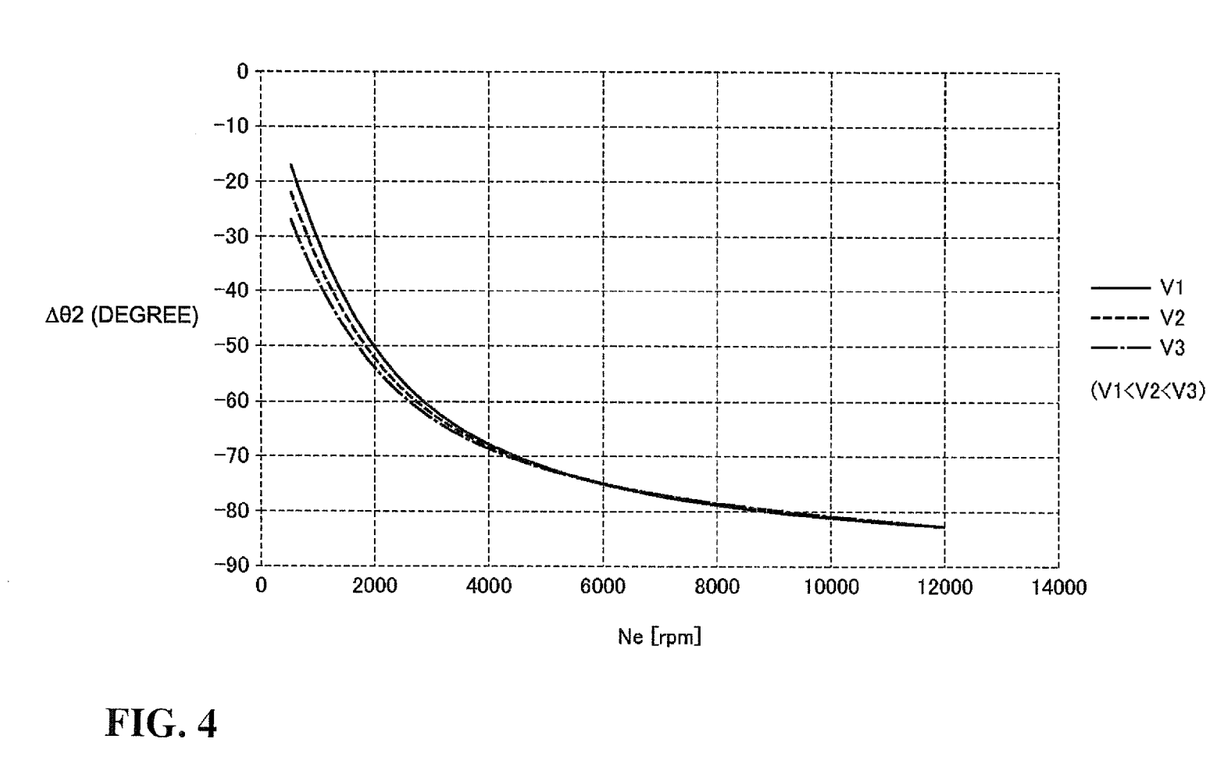
FIG. 4 is a drawing showing an example of a correction map for phase difference correction.

FIG. 4 is a drawing showing an example of a correction map for phase difference correction. The correction map shows the relation among the revolution speed signal Ne, the battery terminal voltage signal Vbatt, and the phase difference Δθ2. Note that the battery terminal voltage shown in FIG. 4 has the relation of V1<V2<V3. That is, the correction map shows the relation between the revolution speed signal Ne and the phase difference Δθ2 with the battery terminal voltage signal Vbatt being a parameter, provides the phase difference Δθ2 corresponding to the revolution speed signal Ne, and further shows correction of the phase difference Δθ2 corresponding to the battery terminal voltage Vbatt. By developing such a correction map based on the expression (3) or by developing such a correction map from a result measured by changing the charging state of the battery, calculation of the phase difference Δθ2 referring to the correction map becomes possible.

After the engine starts, when the revolution speed signal Ne shows a predetermined revolution speed region (in the vicinity of 1,000 rpm, 2,000 rpm, 4,000 rpm for example), the phase difference correction processing is started. It is a matter of course that to start the phase difference correction processing is not necessary when, after the phase difference correction processing is executed in the vicinity of 1,000 rpm for example, the revolution speed signal Ne shows the vicinity of 1,000 rpm again.

Figure 5:
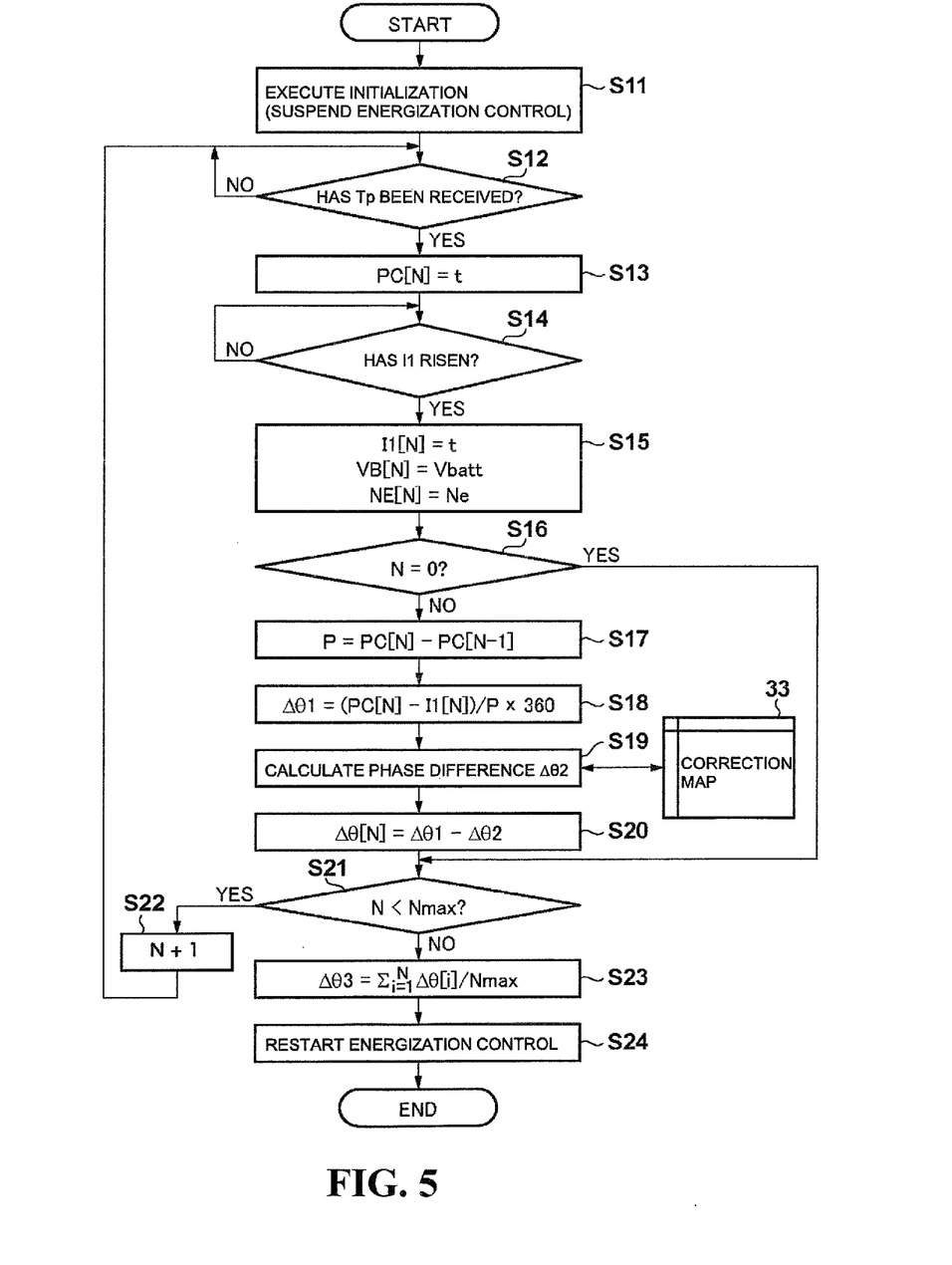
FIG. 5 is a flowchart explaining phase difference correction processing.

FIG. 5 is a flowchart explaining the phase difference correction processing. First, the CPU 32 executes initialization (S11). That is, a counter N and array variables described below are initialized (a stored value is made 0), a timer is started, the energization control of the regulator 20 is suspended, and each switching element is made an open state.

Next, the CPU 32 waits for receipt of the position detection signal Tp (S12), and, when the position detection signal Tp is received, stores a count value t of the timer in the array variable PC[N] (S13). Next, the CPU 32 determines whether the current signal I1 has risen or not (S14). When the current signal I1 rises, the CPU 32 stores the count value t of the timer in the array variable I1[N], stores the battery terminal voltage signal Vbatt in the array variable VB[N], and stores the revolution speed signal Ne in the array variable NE[N] (S15).

Next, the CPU 32 determines the count value of the counter N (S16), advances processing to the step S21 when N=0, and advances the processing to the step S17 when N>0.

When N>0, the CPU 32 calculates a period P (=PC[N]−PC[N−1]) of the position detection signal Tp (S17), and calculates the phase difference 401 between the dropping of the position detection signal Tp and the rising of the current I1 according to the expression below (S18).

$$\Delta\theta 1 = (PC[N] - I1[N])/P \times 360 \tag{5}$$

Next, the CPU 32 refers to a correction map 33 based on the value of the array variables VB[N] and NE[N], and calculates the phase difference Δθ2 (S19). Then, the CPU 32 stores the difference between the phase difference Δθ1 and Δθ2 (Δθ1−Δθ2) in the array variable Δθ[N] (S20).

Next, the CPU 32 determines the count value of the counter N (S21), and, when N<Nmax, increments the counter N (S22), and returns the processing to the step S12. Also, when the counter value reaches Nmax, the CPU 32 acquires the phase difference Δθ3 that is obtained by averaging Δθ[1] to Δθ[N] by the expression below (S23), restarts the energization control of the regulator 20 which uses the acquired phase difference Δθ3 (S24), and finishes the phase difference correction processing.

$$\Delta\theta 3 = \Sigma_{i=1}^{N} \Delta\theta[i]/N\max \tag{6}$$

By the phase difference correction processing described above, the phase difference Δθ3 equivalent to the error of the part dimension and the attaching position of the reluctor 17 and the position sensor 42 can be estimated. As a result, the CPU 32 can precisely execute the energization control of the regulator 20 for using the region of approximately ±10 degrees for example for charging with respect to the phase where the output current value of the armature winding shows the peak.

The reason plural estimate values Δθ3[1] to Δθ3[N] are averaged and the average is made the phase difference Δθ3 is that the rotation of the engine is formed of respective strokes of suction, compression, combustion, and exhaust, and that the variation portion according to the strokes is to be removed. More specifically, estimate values Δθ3[1] to Δθ3 [N] of a plurality of rotations of the generator 10 are averaged, and the phase difference Δθ3 in which the variation portion according to respective strokes are removed is obtained. Nmax (number of times of estimation) showing the upper limit of the count value N for the same is made "8" for example. Also, the phase difference Δθ3 obtained is recorded for every rotation speed signal Ne (the revolution speed region) that becomes a trigger for process start, and the phase difference M3 estimated in a high revolution speed region where the rotation of the engine is stabilized more is preferentially used for the energization control.

Note that the revolution speed Ne can be calculated not only by a method for calculating from the position detection signal Tp but also from a temporal interval of the output signal of the output current or the output voltage of a predetermined phase of the three-phase AC generator. For example, as shown in FIG. 3, when time t from the falling of the output signal of the V-phase to the rising of the output signal of the U-phase is measured, because the output signal is outputted at every 60 degrees of the crank angle, ω is expressed by the expression below.

$$\Omega = (2\pi \times 60/360)/t \tag{7}$$

According to it, because the revolution speed at finer timing can be calculated compared with the case the revolution speed Ne is calculated from the position detection signal Tp, the phase difference Δθ3 can be estimated more precisely.

As described above, in the battery charging apparatus using the three-phase AC generator, the error of the attaching position of the sensor can be detected in executing the energization control of each phase based on the sensor signal that detects rotation of the rotor of the generator, and therefore the energization control of each phase can be executed appropriately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery charging apparatus for a vehicle comprising:
a position sensor for outputting a position detection signal that expresses a rotational position of a rotor of a three-phase AC generator;
a sensor for detecting an output current or an output voltage of a predetermined phase of the three-phase AC generator;
a regulator including a plurality of rectifying elements and a plurality of switching elements for supplying DC power obtained by rectifying three-phase AC outputted from the three-phase AC generator to a battery; and
a control circuit for executing energization control of the respective switching elements of the regulator based on a phase of an induced voltage of the three-phase AC generator calculated on the basis of the position detection signal,
wherein the control circuit includes:
input means for inputting a revolution speed signal showing the revolution speed of the three-phase AC generator, the position detection signal, and either an output signal out of a current signal or a voltage signal detected by the sensor; and
estimate means for estimating an error of an attaching position of the position sensor with respect to the induced voltage of the predetermined phase based on the position detection signal and the output signal.

2. A battery charging apparatus for a vehicle comprising:
a position sensor for outputting a position detection signal that expresses a rotational position of a rotor of a three-phase AC generator;
a sensor for detecting an output current or an output voltage of a predetermined phase of the three-phase AC generator;
a regulator including a plurality of rectifying elements and a plurality of switching elements for supplying DC power obtained by rectifying three-phase AC outputted from the three-phase AC generator to a battery; and
a control circuit for executing energization control of the respective switching elements of the regulator based on a phase of an induced voltage of the three-phase AC generator calculated on the basis of the position detection signal;
wherein the control circuit includes:
input means for inputting a revolution speed signal showing a revolution speed of the three-phase AC generator, the position detection signal, and either an output signal out of a current signal or a voltage signal detected by the sensor;
measurement means for measuring a first phase difference between the position detection signal and the output signal based on the position detection signal and the output signal;
calculation means for calculating a second phase difference between the induced voltage of the predetermined phase and the output signal based on the revolution speed signal; and
estimate means for estimating a third phase difference between the position detection signal and the induced voltage of the predetermined phase from the first and second phase differences.

3. The battery charging apparatus for a vehicle according to claim 2, wherein the control circuit executes the energization control using the third phase difference.

4. The battery charging apparatus for a vehicle according to claim 2, wherein the control circuit suspends the energization control, estimates the third phase difference, and thereafter restarts the energization control using the estimated third phase difference.

5. The battery charging apparatus for a vehicle according to claim 3, wherein the control circuit suspends the energization control, estimates the third phase difference, and thereafter restarts the energization control using the estimated third phase difference.

6. The battery charging apparatus for a vehicle according to claim 2, wherein the control circuit executes all phase short circuits in the energization control, estimates the third phase difference, and thereafter restarts the energization control using the estimated third phase difference.

7. The battery charging apparatus for a vehicle according to claim 3, wherein the control circuit executes all phase short circuits in the energization control, estimates the third phase difference, and thereafter restarts the energization control using the estimated third phase difference.

8. The battery charging apparatus for a vehicle according to claim 4, wherein the control circuit executes all phase short circuits in the energization control, estimates the third phase difference, and thereafter restarts the energization control using the estimated third phase difference.

9. The battery charging apparatus for a vehicle according to claim 2, wherein the input means further inputs a terminal voltage signal for showing a terminal voltage of the battery, and
the calculation means corrects the second phase difference based on the terminal voltage signal.

10. The battery charging apparatus for a vehicle according to claim 3, wherein the input means further inputs a terminal voltage signal for showing a terminal voltage of the battery, and
the calculation means corrects the second phase difference based on the terminal voltage signal.

11. The battery charging apparatus for a vehicle according to claim 4, wherein the input means further inputs a terminal voltage signal for showing a terminal voltage of the battery, and
the calculation means corrects the second phase difference based on the terminal voltage signal.

12. The battery charging apparatus for a vehicle according to claim 6, wherein the input means further inputs a terminal voltage signal for showing a terminal voltage of the battery, and
the calculation means corrects the second phase difference based on the terminal voltage signal.

13. The battery charging apparatus for a vehicle according to claim 9, wherein the calculation means calculates the second phase difference referring to a map for expressing a relation among the revolution speed signal, the terminal voltage signal, and the second phase difference.

14. The battery charging apparatus for a vehicle according to claim 2, wherein the control circuit estimates the third phase difference in a plurality of revolution speed ranges of the three-phase AC generator.

15. The battery charging apparatus for a vehicle according to claim 3, wherein the control circuit estimates the third phase difference in a plurality of revolution speed ranges of the three-phase AC generator.

16. The battery charging apparatus for a vehicle according to claim 4, wherein the control circuit estimates the third phase difference in a plurality of revolution speed ranges of the three-phase AC generator.

17. The battery charging apparatus for a vehicle according to claim 14, wherein the control circuit uses the third phase difference estimated in the revolution speed range of a higher revolution speed for the energization control.

18. A battery charging apparatus for a vehicle comprising:
a three-phase AC generator having a rotor;
a position sensor for outputting a position detection signal of a rotational position of a rotor of the three-phase AC generator;
a sensor for detecting an output current or an output voltage of a predetermined phase of the three-phase AC generator;
a regulator including a plurality of rectifying elements and a plurality of switching elements for supplying DC power obtained by rectifying three-phase AC outputted from the three-phase AC generator to a battery; and
a control circuit for executing energization control of the respective switching elements of the regulator based on a phase of an induced voltage of the three-phase AC generator calculated on the basis of the position detection signal;
wherein the control circuit includes:
input means for inputting a revolution speed signal showing a revolution speed of the three-phase AC generator, the position detection signal, and either an output signal out of a current signal or a voltage signal detected by the sensor;
measurement means for measuring a first phase difference between the position detection signal and the output signal based on the position detection signal and the output signal;
calculation means for calculating a second phase difference between the induced voltage of the predetermined phase and the output signal based on the revolution speed signal; and
estimate means for estimating a third phase difference between the position detection signal and the induced voltage of the predetermined phase from the first and second phase differences.

19. The battery charging apparatus for a vehicle according to claim 18, wherein the control circuit executes the energization control using the third phase difference.

20. The battery charging apparatus for a vehicle according to claim 18, wherein the control circuit suspends the energization control, estimates the third phase difference, and thereafter restarts the energization control using the estimated third phase difference.

* * * * *